US010339726B2

(12) United States Patent
Thorley et al.

(10) Patent No.: US 10,339,726 B2
(45) Date of Patent: Jul. 2, 2019

(54) CAR WASH WITH INTEGRATED VEHICLE DIAGNOSTICS

(71) Applicant: Bosch Automotive Service Solutions Inc., Warren, MI (US)

(72) Inventors: Simon Thorley, South Lyon, MI (US); William W. Wittliff, III, Gobles, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

(21) Appl. No.: 14/982,533

(22) Filed: Dec. 29, 2015

(65) Prior Publication Data

US 2017/0186247 A1 Jun. 29, 2017

(51) Int. Cl.
*G07C 5/00* (2006.01)
*G07C 5/08* (2006.01)
*G06Q 20/32* (2012.01)
*B60S 3/00* (2006.01)

(52) U.S. Cl.
CPC .............. *G07C 5/006* (2013.01); *B60S 3/00* (2013.01); *G06Q 20/322* (2013.01); *G07C 5/008* (2013.01); *G07C 5/0825* (2013.01); *G07C 2205/02* (2013.01)

(58) Field of Classification Search
None
See application file for complete search history.

(56) References Cited

U.S. PATENT DOCUMENTS

| | | | | |
|---|---|---|---|---|
| 5,557,268 A | * | 9/1996 | Hughes | G01L 17/005 340/933 |
| 5,920,386 A | * | 7/1999 | Panter | G05B 19/401 356/121 |
| 6,709,530 B1 | * | 3/2004 | Dietsch | B60S 3/04 134/172 |
| 7,772,850 B2 | * | 8/2010 | Bertness | G01R 31/3648 320/136 |
| 7,876,427 B1 | * | 1/2011 | Melvin | G01M 11/064 356/121 |
| 8,125,628 B1 | * | 2/2012 | Lones | G01J 1/0214 356/121 |
| 8,654,322 B2 | * | 2/2014 | Peterson | G01J 1/06 356/121 |
| 2003/0130774 A1 | * | 7/2003 | Tripathi | G07C 5/008 701/31.4 |
| 2004/0133319 A1 | * | 7/2004 | Pillar | A62C 27/00 701/31.4 |
| 2005/0228720 A1 | * | 10/2005 | Pavlic | G06Q 20/04 705/16 |
| 2007/0296961 A1 | * | 12/2007 | Sekine | G01M 11/064 356/213 |

(Continued)

*Primary Examiner* — Tamara L Weber
(74) *Attorney, Agent, or Firm* — BakerHostetler

(57) ABSTRACT

A car wash with integrated diagnostic functions is provided that includes the ability to wash and dry a connected vehicle and perform various diagnostic functions. The various diagnostic functions such as tread depth measurement, measuring tire pressures, performing safety inspection, emissions testing and performing vehicle diagnostics and the like may be performed while the connected vehicle is at the car wash. The results of the diagnostic tests may be provided to the driver at the end of the car wash via the driver's wireless computing device.

19 Claims, 3 Drawing Sheets

(56) References Cited

U.S. PATENT DOCUMENTS

| | | | | |
|---|---|---|---|---|
| 2010/0262335 A1* | 10/2010 | Brozovich | ............ | G07C 5/008 |
| | | | | 701/31.4 |
| 2013/0158777 A1* | 6/2013 | Brauer | .................. | G06Q 10/20 |
| | | | | 701/31.4 |
| 2013/0204798 A1* | 8/2013 | Gabrysch | ............... | G06Q 10/06 |
| | | | | 705/308 |
| 2014/0076366 A1* | 3/2014 | Belanger | ................... | B60S 3/04 |
| | | | | 134/34 |
| 2014/0166168 A1* | 6/2014 | Engel | ................ | B60C 23/0433 |
| | | | | 152/154.2 |
| 2016/0042576 A1* | 2/2016 | Fischer | ................. | G07C 5/008 |
| | | | | 701/29.4 |
| 2016/0159165 A1* | 6/2016 | Bianco | .................. | G08G 1/017 |
| | | | | 73/8 |

* cited by examiner

CAR WASH WITH INTEGRATED VEHICLE DIAGNOSTICS

FIELD OF THE INVENTION

The present invention relates generally to a car wash system. More particularly, the present invention relates to a car wash system having integrated vehicle diagnostics.

BACKGROUND OF THE INVENTION

Vehicle owners take pride in the vehicles they own including spending time and money to clean and maintain their vehicles. Maintaining their vehicle is important to avoid costly repairs. For example, maintaining proper alignment of the tires will prevent the tires from wearing unevenly leading to early and costly replacement of the tires. However, vehicle owners typically will not bring a vehicle in for maintenance unless it's scheduled or that there is something wrong with the vehicle. For example, if the vehicle pulls to the right while being driven, then this will prompt the owner to bring in the vehicle for an alignment.

Further, owners will hand wash their cars at a self-service car wash or at a full-service car wash, which take time to complete. The time at the car wash may range from 15 minutes to an hour depending on whether hand washing or what type of service is being performed at the full-service car wash. At full-service car wash, the owner rides in the vehicle while it's being washed and simply sits still until the wash cycle is completed.

Accordingly, it is desirable to provide a car wash system that includes vehicle diagnostic capabilities to take advantage of the down time at the car wash.

SUMMARY OF THE INVENTION

The foregoing needs are met, to a great extent, by the present invention, wherein in one aspect of an apparatus is provided that in some embodiments include a car wash including capabilities of diagnosing the vehicle, such as wheel alignment, measuring tire pressures, performing safety inspection, emissions testing and performing vehicle diagnostics and the like while at the car wash.

A car wash, that includes a wash bay configured to wash and dry a connected vehicle, a diagnostic bay configured to perform various diagnostic functions including tire depth measurement and retrieving a set diagnostic trouble code from a connected vehicle's electronic control unit, and a control configured to receive the tire depth measurement and the set diagnostic trouble code, the control diagnoses the connected vehicle based on the received tire depth measurement and the set diagnostic trouble code, wherein the diagnosis is sent to a driver's wireless computing device.

A method of washing and performing a diagnostic test on a connected vehicle, that includes the steps of receiving the connected vehicle within the car wash, retrieving, via the connected vehicle's wireless computer system, a set diagnostic trouble code, receiving the set diagnostic trouble code at a control of the car wash, determining a diagnosis of the connected vehicle by the control based on the retrieved set diagnostic trouble code, determining a tread depth of a tire of the connected vehicle via a tire tread determination system, receiving the determined tread depth of the tire by the control, determining if the determined tread depth of the tire indicates that the tire needs an alignment, and sending the diagnosis of the connected vehicle and an indication that the tire needs to be aligned to a driver's wireless computing device.

A car wash, that includes, a wash bay configured to wash, dry and wax a connected vehicle, a diagnostic bay configured to perform various diagnostic functions including tire pressure interrogation to activate a tire sensor on a wheel of the connected vehicle, and emission testing by retrieving a set emission related diagnostic trouble code from a connected vehicle's electronic control unit, and a control configured to receive a tire pressure from the activated tire sensor and the set emissions related diagnostic trouble code, the control determines if the connected vehicle will pass or fail the emission test for a state based on the set emission related diagnostic trouble code, wherein the pass or fail determination is sent to a driver's wireless computing device.

There has thus been outlined, rather broadly, certain embodiments of the invention in order that the detailed description thereof herein may be better understood, and in order for the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
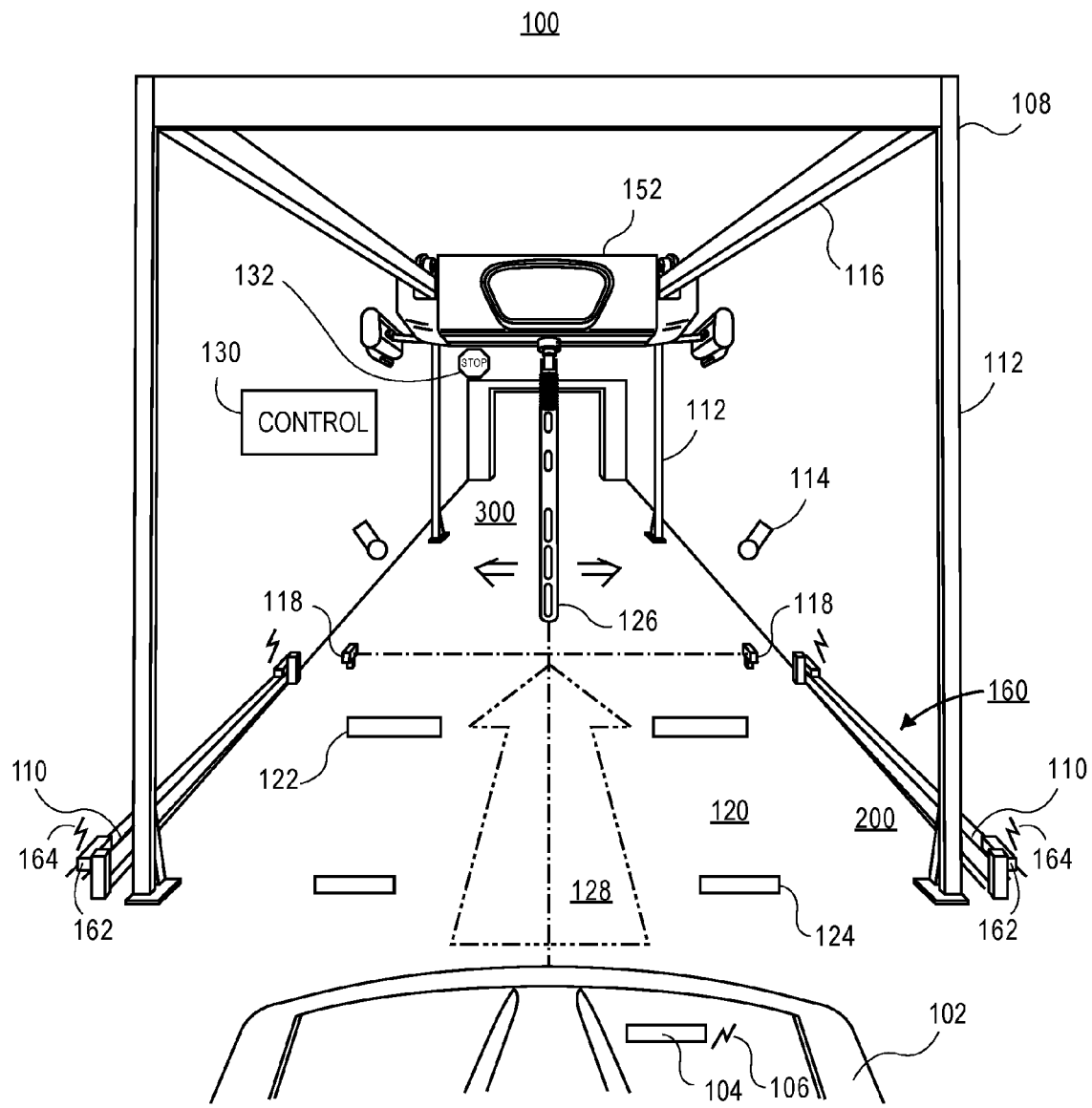
FIG. 1 illustrates a car wash with a connected vehicle according to an embodiment of the invention.

The invention will now be described with reference to the drawing figures, in which like reference numerals refer to like parts throughout. An embodiment in accordance with the present invention provides a car wash facility that is capable of performing vehicle diagnostics while the vehicle is at the car wash. In some embodiments, before, during or after the car wash, vehicle diagnostics such as tire pressure monitoring, wheel alignment, other vehicle diagnostic including retrieving any set diagnostic trouble codes, and safety and emissions testing and the like may be performed. By performing these services at a car wash, vehicle diagnostic will be performed more often then simply when the driver has an issue with the vehicle. Thus, potential damaging issues may be avoided if the issues with the vehicle are detected earlier. In other embodiments, the car wash may be located at a vehicle service center such as a Toyota or General Motors dealer so that any needed service may be performed on-site.

FIG. 1 illustrates a car wash 100 with a connected vehicle 102 according to an embodiment of the invention. The car wash 100 can be any type of car wash including ones with brush, cloth, touch-less and the like. Essentially, the car wash 100 is designed to receive vehicle, such as the connected vehicle 102 and the car wash includes diagnostic capabilities. Car wash 100 may include housing or frame 108 with additional rails 110, 116 that run parallel to a floor 120 and uprights 112 that are generally perpendicular to the rails 110, 116. A wash bay 300 is provided to perform the wash and dry functionality of the car wash. A diagnostic bay 200 may include some or all of the components for the vehicle diagnostics and may be placed before, during or after the car wash.

The connected vehicle 102 includes a wireless computer system 104 that communicates with the various electronic control units of the vehicle in order to retrieve diagnostic information. The electronic control units (ECUs) may contain various software and hardware to provide certain diagnostic information such as set diagnostic trouble codes (DTCs) in the event that the ECU's detect a problem with the vehicle. The wireless computer system 104 may communicate via a wireless connection 106 to an external computing device, such as control 130 of the car wash 100. The wireless connection 106 may communicate via RF (radio frequency), satellites, cellular phones (analog or digital), Bluetooth®, Wi-Fi, Infrared, ZigBee, Local Area Network (LAN), WLAN (Wireless Local Area Network), Wide Area Network (WAN), NFC (near field communication), other wireless communication configurations and standards, or a combination thereof.

Figure 2:
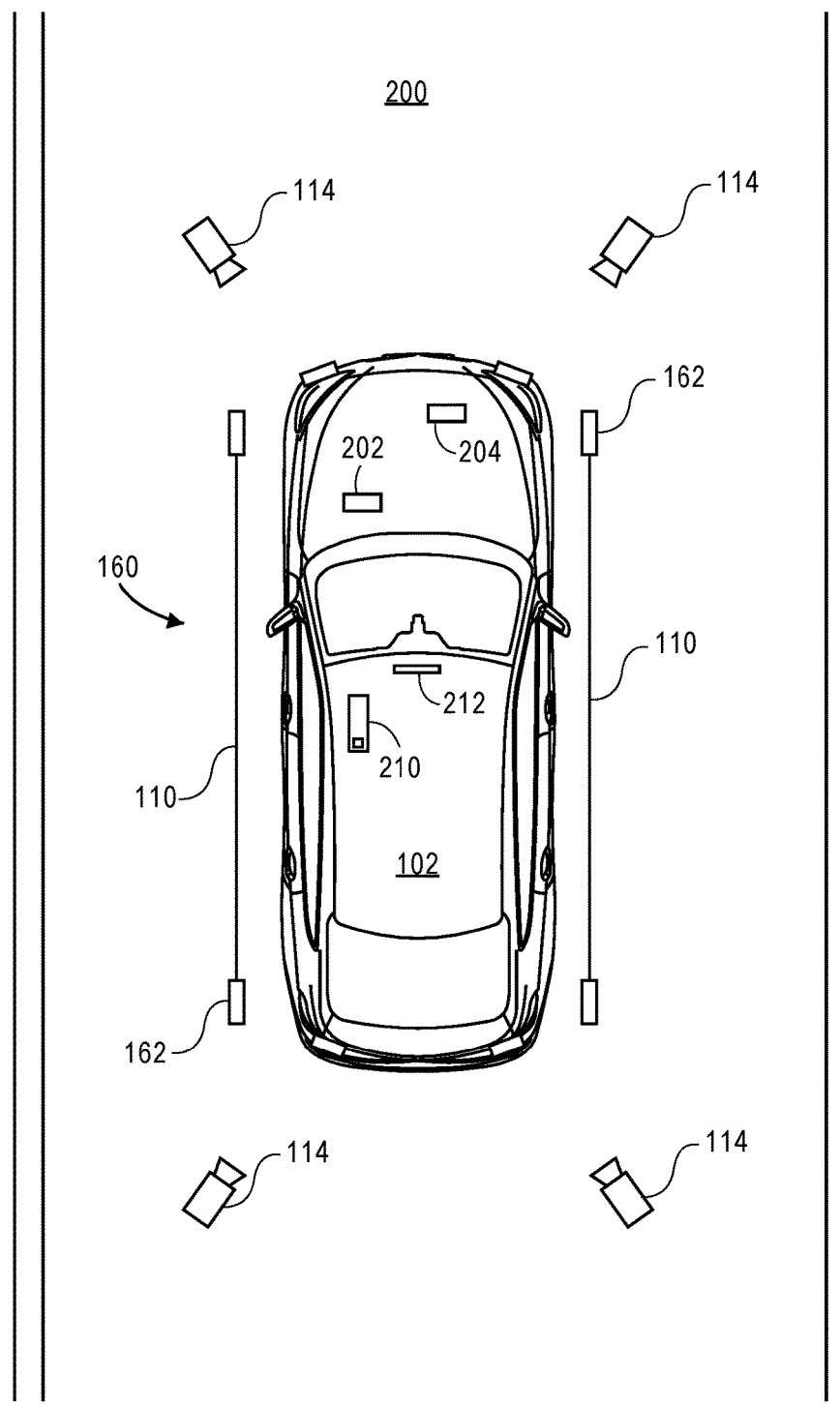
FIG. 2 is a top view of the connected vehicle positioned in the diagnostic bay of the car wash.

In an alternative embodiment, if the connected vehicle 102 does not have any means to retrieve and transmit diagnostic trouble codes and diagnostic information, a wireless diagnostic tool and/or wireless battery tester may be given at the beginning of the car wash process and returned at the end of the wash. The wireless diagnostic tool 202 (FIG. 2) may be the U-Scan™ and wireless battery tester may be the Smart Battery Tester™ both from Bosch Automotive Service Solutions Inc., located in Warren Mich. The driver or wash personnel can connect the U-Scan™ to the vehicle's data link connector and the U-Scan™ can retrieve diagnostic information such as set DTCs in the vehicle or battery level. Additionally, the driver or wash personnel can also connect the Smart Battery Tester™ 204 to provide battery testing results. Both the wireless diagnostic tool 202 and battery tester 204 may transmit the diagnostic information and/or battery testing results to a remote computing device such as control 130 and/or the driver's wireless computing device 210 (FIG. 2).

Floor 120 may include a tire tread determination system 122, in which a tire tread may be determined based on various techniques such as light, imaging, sound, gauge and the like. The tire tread determination system 122 includes at least one tire sensor 124, but may include 2 or more tire sensor 124. In one embodiment, there is one tire sensor 124 configured and positioned to receive each tire of the connected vehicle 102.

The tire tread determination system 122 is configured to measure a depth of a tire in order to determine whether the tire needs to be replaced. The connected vehicle's 102 information, such as a VIN number or tire identifying information can be entered into the control so that the proper tread depth information can be loaded onto the control 130 (further discussed below). Once the VIN or other vehicle/tire identification information is entered, the control 130 can load up a starting depth of a new tire to measure against the tire of the connected vehicle. Instructions to the driver, if needed, may be displayed on the display 132 of the car wash, a display (and/or voice) of sound system 212 (FIG. 2) on the connected vehicle or on the wireless computing device 210. Depending on the tire tread determination system 122 used, an energy signal such as sound, light and the like is emitted and returned to a sensor to measure the various depths of the tires. Once the measured depths information is gathered and compared against the starting depth of a new tire, then the control 130 can let the driver know whether the tire or tires need to be replaced and approximately how soon. Further, the measured depths information may also indicate that an alignment is needed or that the shocks need to be replaced.

In one embodiment, a report may be generated at the end of the car wash and handed to the driver and/or sent to the driver's wireless computing device 210. Thus, if a tire's depth is too narrow to drive further, the driver can be alerted to this safety issue and can be directed to a nearby tire shop or a tow truck can be ordered.

Control 130 may include all the necessary diagnostic information such as parts needed, top fixes based on retrieved diagnostic information or DTCs, warranty information, service bulletins, recalls, and the like. The control 130 may include processors, memories, bus, wireless transceivers, software (operating system, vehicle diagnostic software, car wash software and the like), databases (parts, top fixes, diagnostic information, locations of service stations, parts stores) and the like in order to fully performed all the embodiments of the invention. Based on vehicle diagnostic and retrieved set DTCs, the control using the top fixes database can diagnose the vehicle including parts and services that may need to be performed and the urgency, if any, for the service to be performed and/or the parts to be replaced. In another embodiment, the control 130 may communicate with a remote database to retrieve other or similar information. Additionally, the battery tester may perform the battery tests (e.g. heavy load) on the battery to determine any issues (e.g. not holding charge, discharging too rapidly) with the battery.

Control 130 may also control the car wash functionality such as when to start the washing, drying and waxing process so that the car wash functionality does not interfere with the diagnostic capabilities. For example, the control 130 may not allow the wash function to start before the tire depth is being measured by light as water may interfere with the light being received by the light sensor of the tire tread determination system 122.

In another embodiment, the report can be sent to a wireless computing device 210 of the driver. The wireless computing device may be a smart phone, a smart watch, smart glasses, a tablet, a lap top, a gaming console, a personal computer and the like. If the driver provides contact information, such as cell number, or email address to the car wash owner when purchasing a monthly or yearly pass or if a mobile pay service (e.g. PayPal™, Apple Pay™, Google Pay™) on the wireless computing device is utilized then contact information of the wireless computing device 210 such as mobile identification number, mobile subscription identification number, or unique device identifier and the like may also be provided to the car wash in order to receive the report on the wireless computing device 210.

In still another embodiment, the vehicle's tire pressure sensors and/or the tire pressure monitoring system (TPMS) of the vehicle may be integrated while at the car wash 100 via a tire integrator system 160. The tire integrator system 160 includes tire integrator 162 that communicate via a wireless connection 164. The tire integrator 162 may be mounted on rails 110 and may be manually adjustable or automatically adjustable via micro motors installed on the tire integrator 162. The movement of the micro motors may be controlled by control 130 so that proper interrogation of the vehicle's tire pressure sensors or TPMS system by the tire integrator 162 is accomplished. That is some tire pressure sensors may require the tire integrator 162 to be in close proximately in order to interrogate the tire pressure sensors and thus adjustments may be needed for variety of vehicles (e.g. sedan, truck).

Upon activation of the tire pressure sensors or the TPMS, the various information of the tires may be received by control 130 including tire pressure, ID of the tire pressure sensors and on which tires each of the sensors are located in relation to the vehicle, battery or power remaining on the tire sensors and the like. The vehicle information may have been previously provided to the control 130 or the tire integrator system 160 may automatically interrogate the tire sensors or TPMS using various different communication means until a return signal is received. For example, ultra high frequency such as 434 MHz or 315 MHz may be sent to the tire sensors. If manual activation through a magnet is required, then a car wash technician or even the driver may be instructed to place the magnet near each tire sensors for activation of the sensor in order to send the tire information to the control 130.

In a further embodiment, a partial safety inspection including an emission inspection may also be performed at the car wash 100. Emission inspection includes querying the ECUs of the vehicle for any emissions related issues and any set emissions related DTCs. As noted herein, DTCs and diagnostic information may be transmitted via the connected vehicle 102 through the wireless computer system 104 or via the wireless diagnostic tool 202. Thus, emissions testing may be conducted at the car wash 100. The control receives any set emission related DTC to determine if the vehicle can pass inspection for that particular state in which the car wash is located. The control can access its database to help make this determination and send the report to the driver's wireless computing device.

Additionally, cameras 114 (or photocells) and a beam light bar 126 may properly positioned to determine whether lights on the connected vehicle 102 are working in order to pass the safety inspection. The beam light bar 126 may be moved left to right and up and down in relation to arrow 128 to accommodate different positions of headlights in a sedan versus a truck. Movement of the beam light bar 126 may be facilitated by equipment array 152 having micro motors, known in the art, to provide said movements. The beam light bar 126 may detect if the headlights are misaligned. Further, the cameras may also provide proof to state inspection facilities that the lights on the vehicle are working properly or be displayed to the driver that a light is out. The vehicle's lights may include, turn lamps, headlights, back up lights, brake lights, license plate lights and the like. Although safety inspection may not be fully performed in the car wash, it may be completed right outside the car wash by an inspector for the remainder of the safety inspection and thus, saving time for the driver. Additionally, the driver may have an opportunity to fix any issues before paying for a full inspection as often inspection facilities will not provide a partial refund for failed inspections. Instructions to the driver, if needed, to turn on or activate certain lights may be displayed on the display 132 of the car wash, a display 212 (or voice) on the connected vehicle or on the wireless computing device 210.

Floor 120 also includes vehicle sensor 118 that senses the presence of the connected vehicle. Once the vehicle sensor 118 is detect the presence of the connected vehicle, the typical car wash functionality may start, such as washing, waxing, drying and the like. The car wash functionality may be performed in wash section 300 of the car wash 100. The one or more of diagnostic functions of the car wash 100 may be performed before the connected vehicle 102 reaches the vehicle sensor 118 or be performed after the connected vehicle finishes the typical car wash functions.

FIG. 2 is a top view of the connected vehicle 102 positioned in the diagnostic bay 200 of car wash 100. In one embodiment, the diagnostic bay may be placed before the actual car wash functions are started. In another embodiment, the diagnostic bay 200 may be placed after the car wash functions are completed or mostly completed. In still another embodiment, the diagnostic bay 200 may be placed during the car wash functions. Each of the various diagnostic capabilities discussed herein may be located in one diagnostic bay (i.e. before car wash functionality) or may be spread out (i.e. before car wash and after car wash functionality) depending on the design of the car wash. While in the diagnostic bay, the tire depth can be measured as discussed herein.

Tire pressure and TPMS systems may be interrogated by the tire integrator system 160, which includes the tire integrator 162 located near or on the ends of rail 110. As previously discussed the tire integrator 162 may be moved by micro motors (controlled by control 130) to which the tire integrator 162 are mounted to or be manually moved along the rail 110 in order to be positioned near the tire sensors and/or TPMS system.

Cameras 114 or photocells may be mounted in the car wash, for example on upright 112, to view the front and back of the connected vehicle 102 in order to perform a partial safety inspection. The driver may be instructed (via display or voice) to turn on the lights, turn on blinkers or brake lights and the like while in the diagnostic bay in order to perform the safety inspection. The remaining safety inspection may be performed upon exiting the car wash or done previous to entering the car wash. In one embodiment, the remaining portion of the safety inspection is done after a determination that all of the lights are working properly so that a full inspection fee is not paid in the event of a non-working light bulb.

The connected vehicle 102 may include the wireless computing system 104 and/or a wireless diagnostic tool 202 may be provided to the driver upon entering the car wash 100 in order to conduct diagnostic on the connected vehicle including retrieving any set DTCs. Further, instructions or diagnostic reports (from various diagnostic tests conducted in the diagnostic bay) to the driver may be sent to the display 212 in the vehicle and/or to the driver's wireless computing device 210.

Battery tester 204 may also be provided to the driver or placed near the battery by the car wash technician. Then the battery tests may be conducted and the results of the test may be wireless sent to the control 130 or the driver's wireless computing device 210. At the control 130, warranty information about the battery or recall information may be retrieved from databases and sent to the driver. Further control 130 may also receive the battery test information and run additional diagnostic on the data sent by the battery tester 204. The battery information may be previously entered into the control 130 or the battery bar code scanned, for example, by the driver's wireless computing device 210.

Figure 3:
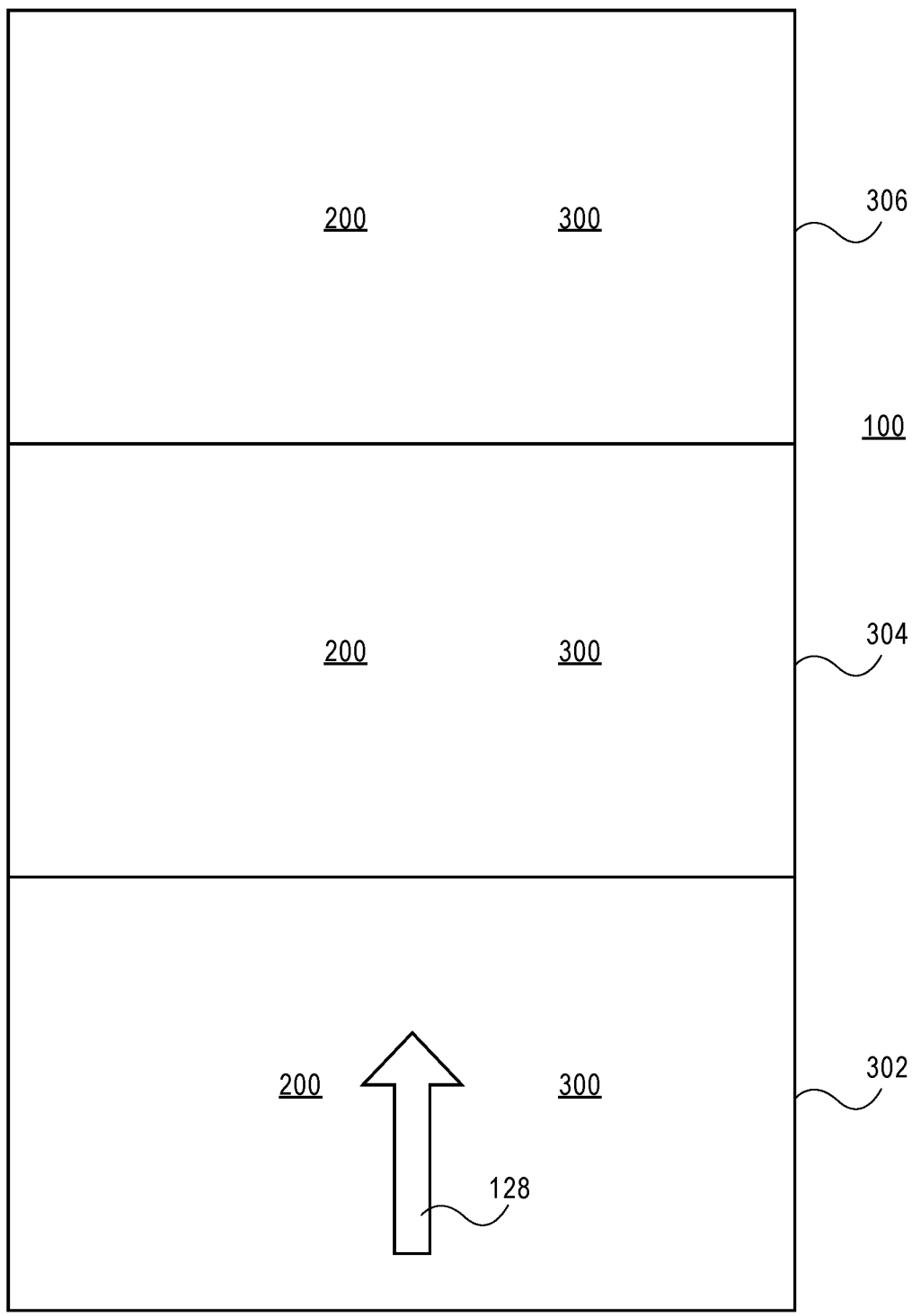
FIG. 3 illustrates various placements of the diagnostic bay in car wash.

FIG. 3 illustrates various placements of the diagnostic bay 200 in car wash 100. Arrow 128 indicates the direction and where the connected vehicle 102 could enter the car wash 100. Depending on the desired configurations and diagnostic tests offered at the car wash, the diagnostic bay 200 may be placed in the first third 302 of the car wash 100, the second third 304 or middle of the car wash 100 and/or last third 306 of the car wash 100. Any combination or all of the diagnostic capabilities that are available may be in one or more of the diagnostic bay 200 and in one or more thirds (302, 304, 306) of the car wash 100. That is, in diagnostic bay 200 of first third 302, the tire depth measurement may be conducted. Then in the second third, the wireless computing system 104 and/or a wireless diagnostic tool 202 may interrogate the vehicle ECUs to retrieve any DTCs or diagnose issues with the connected vehicle 102. In the last third 306, the diagnostic bay may include the tire integrator system 160 to interrogate tire sensors or TMPS and the cameras for the safety inspection may be positioned to view lights on the connected vehicle 102.

The wash section 300 of the car wash 100 may be positioned in the first (302), second (304) and/or last third (306) of the car wash depending on the configuration desired by the owner. Certain wash function such as washing with liquid may interfere with certain tests such as tire depth and thus, it may not be desirable to place the wash section 300 where tire depth measurement is conducted. However, the car wash functions may be spread out throughout the car wash so that the desired configuration of car wash functions and the diagnostic capabilities are synergistic with each other or don't interfere with each other.

It should also be noted that the software implementations of the invention as described herein can be stored on a tangible, non-transitory storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and including art-recognized equivalents and successor media, in which the software implementations comprising code segments are stored. Additionally, although a diagnostic tool is described herein, the invention may be implemented on any computing device such as a personal computer, notebook, smart phone, a tablet and the like.

The many features and advantages of the invention are apparent from the detailed specification, and thus, it is intended by the appended claims to cover all such features and advantages of the invention, which fall within the true spirit, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A car wash, comprising:
    a wash bay configured to wash and dry a connected vehicle;
    a diagnostic bay configured to perform various diagnostic functions including tire depth measurement, tire pressure monitoring, and retrieving a set diagnostic trouble code from a connected vehicle's electronic control unit, the diagnostic bay further configured to include a camera that captures images of a light of the connected vehicle to perform a safety inspection of the connected vehicle, the diagnostic bay further includes a tire interrogator mounted on rails, and the diagnostic bay further includes a beam light bar configured to be positioned to detect if the light on the connected vehicle, the beam light bar being movable via micro motors; and
    a controller configured to receive the tire depth measurement, tire pressure, images from the camera, and the set diagnostic trouble code, the controller controls micro motors to adjust the tire interrogator, the controller diagnoses the connected vehicle based on the received tire depth measurement, tire pressure, and the set diagnostic trouble code, wherein a diagnosis is sent to a driver's wireless computing device, and wherein instructions to a driver to turn on a light of the connected vehicle as part of a safety inspection is displayed on a display of the connected vehicle; and wherein the controller is further configured to control a start of washing, and drying process of the wash bay so as to not interfere with the diagnostic functions of the diagnostic bay.

2. The car wash of claim 1 further comprising a wireless battery tester that conducts a battery test when connected to a vehicle's battery and sends results of the battery test wirelessly to the driver's wireless computing device or the controller.

3. The car wash of claim 1, the controller is configured to receive a battery test via a wireless battery tester that is connected to the connected vehicle's battery.

4. The car wash of claim 1, wherein the diagnostic bay is positioned before the wash bay so that the wash does not interfere with the diagnostic functions of the diagnostic bay.

5. The car wash of claim 1, wherein the diagnostic functions include the safety inspection.

6. The car wash of claim 1, wherein the diagnostic functions include an emission inspection.

7. The car wash of claim 6, wherein the emission inspection includes retrieving a set emissions related diagnostic trouble code.

8. The car wash of claim 1, wherein the diagnostic bay is positioned after the wash bay so that the wash does not interfere with the diagnostic functions of the diagnostic bay.

9. The car wash of claim 1, wherein the diagnosis further includes top fixes, parts and services and an urgency of the services based on the set diagnostic trouble code.

10. A method of washing and performing a diagnostic test on a connected vehicle, comprising the steps of:
    receiving the connected vehicle in a car wash, the car wash comprising a diagnostic bay and a wash section;
    retrieving a tire pressure and sensor identification of a tire of the connected vehicle with a tire pressure monitoring system having a tire interrogator mounted on rails and positioned within the diagnostic bay of the car wash;
    sending the retrieved tire pressure and sensor identification to a controller of the car wash, and the controller controlling micro motors to adjust the tire interrogator;
    retrieving, via a connected vehicle's wireless computer system, a set diagnostic trouble code;
    receiving the set diagnostic trouble code at the controller of the car wash;
    determining a diagnosis of the connected vehicle by the controller based on the retrieved set diagnostic trouble code;

displaying, on a display of the connected vehicle, instructions to a driver of the connected vehicle to turn on a light for an inspection test;

detecting the light on the connected vehicle with a beam light bar positionable by micro motors controlled by the controller;

capturing an image of the turned-on light of the connected vehicle with a camera positioned in the car wash;

controlling a car wash functionality with the controller of the car wash to not allow a wash function to start before measuring a tread depth of a tire;

determining the tread depth of the tire of the connected vehicle via a tire tread determination system;

receiving the determined tread depth of the tire by the controller;

determining if the determined tread depth of the tire indicates that the tire needs an alignment;

sending the diagnosis of the connected vehicle and an indication if the tire needs to be aligned to a driver's wireless computing device;

displaying on the display of the driver's wireless computing device the indicator and the diagnosis; and washing the connected vehicle after the sending the diagnosis.

11. A car wash, comprising:

a wash bay configured to wash, dry and wax a connected vehicle;

a diagnostic bay configured to perform various diagnostic functions including tire pressure interrogation to activate a tire sensor on a wheel of the connected vehicle, and emission testing by retrieving a set emission related diagnostic trouble code from a connected vehicle's electronic control unit;

the diagnostic bay further configured to include a camera that captures images of a light of the connected vehicle to perform a safety inspection of the connected vehicle, the diagnostic bay further includes a tire interrogator mounted on rails, and the diagnostic bay further includes a beam light bar configured to be positioned to detect the light on the connected vehicle, the beam light bar being movable via micro motors; and a controller configured to receive a tire pressure from the activated tire sensor, images from the camera, and the set emissions related diagnostic trouble code, the controller controls micro motors to adjust the tire interrogator, the controller determines if the connected vehicle will pass or fail an emission test for a state based on the set emission related diagnostic trouble code, wherein a pass or fail determination is sent to a driver's wireless computing device, and wherein instructions to a driver to turn on a light of the connected vehicle as part of a safety inspection is displayed on a display of the connected vehicle, and wherein the controller is further configured to control a start of washing, and drying process of the wash bay so as to not interfere with the diagnostic functions of the diagnostic bay.

12. The car wash of claim 11 further comprising a wireless battery tester that conducts a battery test when connected to a vehicle's battery and sends results wirelessly to the driver's wireless computing device or the controller.

13. The car wash of claim 11, the controller is configured to receive a battery test via a wireless battery tester that is connected to the connected vehicle's battery.

14. The car wash of claim 11, wherein the diagnostic bay is positioned before the wash bay so that the wash does not interfere with the diagnostic functions of the diagnostic bay.

15. The car wash of claim 11, wherein the diagnostic functions include a safety inspection.

16. The car wash of claim 11, wherein the diagnostic bay is positioned after the wash bay so that the wash does not interfere with the diagnostic functions of the diagnostic bay.

17. The car wash of claim 11, wherein the diagnostic functions also include tire depth measurement via a tire tread determination system.

18. The car wash of claim 11, wherein a contact information for the driver's wireless computing device is provided when a mobile pay system on the driver's wireless computing device is used to pay for a car wash.

19. The car wash of claim 11, wherein the diagnosis further includes top fixes, parts and services and an urgency of the services based on the set diagnostic trouble code.

* * * * *